United States Patent [19]
Later

[11] Patent Number: 5,992,169
[45] Date of Patent: Nov. 30, 1999

[54] APPARATUS AND METHODS FOR VACUUM COOLING PRODUCE

[76] Inventor: Roger C. Later, 1427 Euclid St., Santa Monica, Calif. 90404

[21] Appl. No.: 09/040,139

[22] Filed: Mar. 17, 1998

[51] Int. Cl.[6] ..................................................... F25B 19/00
[52] U.S. Cl. .................................. 62/270; 62/64; 62/264; 62/100
[58] Field of Search ................................ 62/268, 270, 62, 62/64, 171, 78, 304, 310, 264, 100

[56] References Cited

U.S. PATENT DOCUMENTS

| | | |
|---|---|---|
| 3,844,132 | 10/1974 | Miller et al. . |
| 4,061,483 | 12/1977 | Burg . |
| 4,141,224 | 2/1979 | Alger et al. . |
| 4,407,140 | 10/1983 | Kobayashi . |
| 4,576,014 | 3/1986 | Miller et al. . |
| 4,615,178 | 10/1986 | Badenhop ................................. 62/100 |
| 4,776,181 | 10/1988 | Maule . |
| 4,827,727 | 5/1989 | Caracciolo . |
| 4,882,911 | 11/1989 | Immel . |
| 4,942,053 | 7/1990 | Franklin et al. . |
| 5,277,031 | 1/1994 | Miller et al. .............................. 62/100 |
| 5,375,431 | 12/1994 | Later et al. . |
| 5,386,703 | 2/1995 | Later ........................................ 62/268 |

*Primary Examiner*—William Doerrler
*Attorney, Agent, or Firm*—Patrick F. Bright

[57] ABSTRACT

Method and apparatus for vacuum cooling field harvested produce such as lettuce includes a vacuum chamber, a partial vacuum-forming mechanism in the chamber, a water discharging mechanism in the chamber for spraying water onto the produce to cool the produce, and a mechanism in the chamber for detecting and adjusting the temperature and pressure, dynamically, to minimize undesired removal of water from the surface and interstitial tissues of the produce.

46 Claims, 2 Drawing Sheets

APPARATUS AND METHODS FOR VACUUM COOLING PRODUCE

FIELD OF THE INVENTION

Apparatus and methods for vacuum cooling and controlling the vacuum cooling of fresh produce, especially soft, porous produce, measure accurately the total heat of a load of produce to be cooled, and adjust the cooling dynamically such that the desired amount of water, the desired water temperature, and desired sub atmospheric pressure, applied for the correct amount of time, reduces desiccation and/or water infiltration damage to the produce.

BACKGROUND OF THE INVENTION

It is necessary to remove field heat and to otherwise cool produce to preserve the produce for shipment to market. Some methods of cooling produce appear in U.S. Pat. No. 5,375,431, entitled Produce Cooler and Method of Cooling Produce, issued Dec. 27, 1994; in U.S. Pat. No. 5,386,703, entitled Apparatus and Methods for Vacuum Cooling Fresh Produce, issued Feb. 7, 1995; U.S. Pat. No. 4,576,014, entitled Produce Vacuum Cooler With Improved Venting, issued Mar. 18, 1986, and in U.S. Pat. No. 3,844,132 entitled Produce Cooler and Method of Cooling Product, issued Oct. 29, 1974. The text and drawings of these four patents are incorporated herein by reference as though fully set forth here. Some of these patents describe apparatus comprising a vacuum chamber for receiving produce, a vacuum pump, a refrigeration system for collecting evaporated water and a pump for spraying water onto the produce. The vacuum pump reduces pressure within the chamber to sub atmospheric level, causing evaporation of moisture from the produce. This evaporation removes heat from the produce, reducing its temperature. Water vapor formed by such evaporation condenses on cooling coils positioned above the produce. These refrigerated coils preferably condense and collect as much water as is feasible to prevent the water from reaching the vacuum pump. This water is collected and directed to a reservoir below the produce. The collected water, in preferred embodiments, is at a temperature in the range of about 33 to about 35 degrees Fahrenheit. Additionally, a water recirculating system can utilize water from the reservoir at the bottom of the vacuum chamber and spray it over the produce for further cooling effect. This reservoir water may be passed through a filtration device utilizing non-residual free radical chemical methods of filtration or ultraviolet light to reduce the micro biotic load and insure freshness.

The advent and increased popularity of processed lettuce, i.e, chopped or shredded lettuce enclosed in bags with special atmospheres, has generated a need for improved handling, pre-cooling and processing, and a need to minimize abused, desiccated or decaying lettuce.

At present, Iceberg lettuce is cooled without spraying water on to it. Romaine, Red Leaf, Green Leaf and other thinner leaf lettuces need sprayed water for adequate cooling. The water weight percentage range for Iceberg Lettuce is between 95.72 and 94.76 percent while the range for Romaine and the Leaf Lettuces is between 95.07 and 93.67 percent with most of this water stored in the stalk of the leaf. It has been determined that there is a one percent (1%) by weight moisture loss from produce tissue when vacuum cooling without water for every 10 degree F temperature reduction (Page 5 of Exhibit 1, USDA Market Research Report No. 469, 1961). This water loss through vaporization is pulled from the produce tissue. This water loss through evaporation amounts to 28.75 gallons of water evaporated for every 10 degree F temperature reduction for a typical twelve ton, 24,000-pound produce load.

480 boxes/load × 50 pounds/box
24,000 pounds/load × .01 moisture loss
240 pounds water × .1198 pounds/gallons of water
28.75 gallons/10° F. change Introducing a water spray to the vacuum cooling process, as disclosed in U.S. Pat. No. 3,844,132, adequately cooled leafy lettuces such as Romaine, Red Leaf and Green Leaf that lacked enough water in their tissues to enable proper cooling. When a water recirculating spray system is used, the produce weight loss is reduced because water evaporates from the surface of the produce rather than being drawn from its tissues. When water is drawn from the tissues of produce, resulting desiccated leaves are unappealing to buyers and useless to lettuce processors. Originally (Exhibit 1, page 7), moisture loss was assumed to be uniform throughout a lettuce head because of the nature of vacuum pressure. However, moisture loss has been found to be concentrated in the outer leaves of the lettuce head. The moisture loss concentration is due to two factors: first, the inner leaves of Iceberg lettuce are coated with naturally occurring water; second, the outer leaves are almost always warmer (having absorbed sunlight and the rising ambient air temperature) and need more evaporation to achieve the desired cooling. The typical 3–4 percent moisture loss (change in temperature is about 30 to about 40 degrees) results in a 25–35 percent tissue loss (excluding core which is 5–11% additional loss) by weight to the package lettuce processors. However, even a one percent moisture loss concentrated in the outer, more desired green leaves of a head of Iceberg Lettuce results in a substantial loss of marketable tissue.

Flowing a large amount of cold water over produce and cooling it by simple heat transfer was thought to be beneficial. However, at 970.3 Btu's/pound of water evaporated, (1072 Btu at 4.6 mm pressure) the change of phase of water has proved to be a more efficient method of cooling. Also, leaving water on produce tissue has proved to accelerate produce decay. Water that condenses on the refrigerated coils may have a temperature in the range of about 33 to about 35 degrees Fahrenheit. At these temperatures, it is difficult to reduce and control the sub atmospheric pressure at a level sufficient to evaporate such water without the evaporation freezing the produce. Produce picked early in the morning with low (33–40° F. ) tissue temperatures is especially vulnerable to vacuum infiltration and/or freezing damage because only a portion of the sprayed water is evaporated before the produce tissue temperature reaches 32 degrees F. Initial attempts at reducing the tissue loss in Iceberg Lettuce by using water during the vacuum cooling process failed because the low temperature of the reservoir spray water and the porosity of Iceberg tissue resulted in water being left in and on the tissue, leading to accelerated decay. This failure is highlighted by the fact that the bagged lettuce processing industry now primarily uses two separate procedures to dry (the centrifuge) and cool (forced air cooling) its processed lettuce. This combination of procedures is utilized despite the fact that there are a number of product quality and operational problems. The centrifuge baskets need to be limited in size to effectively dry the tissue and they cut the tissue of the produce being dried, especially the thin leaf and baby lettuces, resulting in a further reduction of usable processed tissue. Also, with the cooling of the lettuce done by transporting the tissue through a stream of cold air all of the employees in the processing area need to use winter clothing in order to protect themselves from the chill created by the cool air.

Therefore, a major problem facing produce processors using vacuum cooling with water today, is how much water to spray at what water temperature, and when to spray it to minimize tissue desiccation without leaving free water on the tissue. In making this determination, it is important to know the field temperature of the produce to be cooled, and the desired water temperature, so that the water on the surface of the produce can be evaporated entirely to achieve the desired cooling and desired moisture content. Lettuce, celery and the like that are picked in the morning may have less heat to be removed than that which is picked in the warm afternoon. Finished cooling temperature of produce should always be below 40° F.; the ideal temperature range is between 33–38° F.

Determining the average temperature of a number of boxes of produce to adjust the cooling process accordingly has been too cumbersome and time consuming a procedure. At this time, an operator of a vacuum chamber with or without water may insert a temperature reading probe into selected produce to determine its temperature and use this data to estimate the total heat to be removed. The operator can thereafter adjust a timer to start the flow of cooling water onto the produce after a predetermined sub atmospheric pressure is reached within the chamber. Another timer is set to terminate the process after an appropriate sub atmospheric pressure has been reached. The operator may lengthen the cooling time under sub atmospheric pressure if ambient air and produce temperatures rise.

An accurate method for assessing total heat within a vacuum chamber during a cooling process is to observe the sub atmospheric pressures at which evaporations (flashes) occur. The accuracy of this method rests in the thermodynamic properties of steam as set forth in the reference book with the same title by Joseph H. Keenan and Frederick C. Keyes, Exhibit 2. This text with its data for the liquid and solid phases section is the foundation for the physical properties of water. Disclosed in this text is that while water evaporates at 212° F. at atmospheric pressure of 14.7 lbs/in$^2$ if the pressure is reduced to 0.08854 lbs/in$^2$ (4.6 mm) liquid water will change to vapor at 32.0° F. Thus, a pound of water at atmospheric pressure occupies 27 cubic feet while at 0.08854 lbs/in$^2$ a pound of water occupies 3306 cubic feet. (Exhibit 2, Table 1; Exhibit 1, Page 12, FIG. 5). These evaporations (flashes) take place when the sub atmospheric pressure within the chamber reaches the flash point of the water in and on the produce tissue (Exhibit 2, Table 1). After measuring the pressure at which evaporations/flashes that occur, an operator can determine the aggregate heat load in the chamber and can adjust the amount of water to be sprayed and amount of time needed for cooling.

It is an object of this invention to provide processes and apparatus to chill produce by removing surface water and a desired amount of interstitial water from the produce while minimizing desiccation in which the heat of a load of produce can be measured accurately, and the controls of the vacuum cooling equipment, water spray and water temperature adjusted accordingly.

SUMMARY OF THE INVENTION

A produce cooler comprises a, vacuum chamber including a means for forming a partial vacuum inside the chamber for cooling, by evaporation, produce placed in the chamber. The chamber also includes a mechanism for cooling and condensing water vapor in the chamber so that cooled, condensed water passes into a collector, and is fed from the collector to a sump in the chamber, substantially preventing unwanted water from falling onto, and thereby bruising, or discoloring, the produce in the chamber. This reservoir water may be passed through a filtration device utilizing non-residual, free radical chemical methods of filtration or ultraviolet light to reduce the micro biotic load and insure freshness.

The chamber may have a means for directing water from the sump or other sources over the produce to make this water available for evaporation from the surface of the produce. In preferred embodiments, the chamber includes means for adjusting the water temperature or for heating collected water, and for maintaining the water at a desired temperature. This water is maintained at a desired temperature such that, when the water is applied to the produce, the water reaches a predictable equilibrium temperature on the surface of the produce. This temperature lies between the field temperature of the produce and the condensed water temperature. Water returned to the sump after condensing on the refrigeration coils above the produce may, for example, have a temperature in the range of about 33 to about 35 degrees F. Water nozzles positioned above the produce direct water onto the produce sufficiently gently to minimize both water infiltration into the produce and application of excessive water to the produce. The chamber includes means for venting the chamber to the outside atmospheric pressure gradually, slowly and evenly through the water nozzles positioned above the produce.

The vacuum cooling chamber operations are controlled by a panel of electrical switches and timer switches. These switches load and unload produce from the chamber, close and open the doors, energize the coolant control valves that supply coolant to the coils above the produce to collect the evaporated water, activate the vacuum pump to reduce pressure inside the chamber to a sub atmospheric level, open and close a valve allowing a vacuum pump to reduce the pressure inside the chamber, open and close valves allowing the pump water to pass through ultraviolet or non-residual oxidation filtration, and initiate or terminate the spraying of water onto the produce. Preferred embodiments may also include a panel of switches for controlling devices to control the water temperature or to heat recycled water. The chamber also has a device for measuring and controlling the sub atmospheric pressure within the chamber.

When produce enters a cooling facility, an operator identifies the type of produce and selects the sub atmospheric pressure set point corresponding to the desired, final temperature. The operator inserts a temperature reading probe into the produce and then selects a desired water temperature or range of temperatures. If the produce temperature is less than 40° F., the water should be about 40° F. or higher. If the produce temperature is between 40–45° F., the cooling water may also be about 40–45° F. If the produce temperature is above 45° F. the cooling water may be ±5° F. of the produce temperature as long as the water temperature is below the sub atmospheric vapor point pressure within the chamber.

The operator loads the produce into the vacuum chamber, closes the doors, sprays water to coat the produce, opens the valve allowing refrigerant to circulate through the coil in the chamber, and starts the vacuum pump. The pressure inside the chamber falls to the pressure that corresponds to the vapor pressure of the water coating the produce. At this point, the water coating the produce evaporates, cooling the produce. This evaporation causes the sub atmospheric pressure within the chamber to rise slightly, providing an accurate measure of the aggregate temperature of the produce inside. Knowing the aggregate temperature the total heat load within the chamber, the BTU's to be removed to bring the produce to the desired temperature, and the cubic centimeters of water needed to be evaporated to effect that change in temperature can be calculated.

If the first evaporative flash occurs at 5.6 mm or less, no more water need be sprayed because the produce is within the typical desired temperature range. If the evaporative flash occurs above 5.6 mm, the controller should spray water onto the produce again. This spray and evaporation process can be repeated as necessary to reduce the temperature of the produce to the desired level. After reading the evaporative flash the controller also sets the amount of time to hold the produce at the selected sub atmospheric pressure. This time setting allows sufficient time to remove the necessary heat in the produce to reach the set point, and is different for different produce, depending in part on the surface area to weight ratio of the product. For Red Leaf, Green Leaf and Butter Lettuces, if the first evaporative flash occurs at 5.6 mm or less, the holding time may be about one minute. If the first flash occurs at 30.8 mm, the holding time may be about six minutes. The holding time after reaching the selected set point is a linear function between these pressures.

After the set time has elapsed, the valve between the vacuum pump and the vacuum chamber is closed. If the chamber maintains the selected sub atmospheric set point pressure, the produce within the chamber is at the desired temperature and the process can be terminated and the produce removed. If the pressure within the chamber begins to increase, this increase indicates that evaporation is continuing, and the produce has not reached the desired temperature. At this time the valve between the vacuum pump and chamber may be reopened to continue the evaporative process until a time when, with the valve closed, the pressure is maintained and the process can be terminated. Upon termination the produce has the desired temperature, but has suffered minimal weight loss.

Another variant for the vacuum cooling with water process would be to use sub atmospheric vacuum pressure to both chill and dry process (chopped or shredded) produce. With this process, produce would be prepared prior to the vacuum chamber such that spraying water within the chamber would be unnecessary while all other operations would remain the same. This preparation for vacuum cooling/drying could include but not be limited to chopping, shredding, separating, shucking and dividing of produce. Forced air cooling of produce followed by spraying the produce with water, or spraying water to cool produce, or immersing produce in water to cool it achieves an even coating of water such that when the produce is subjected to sub atmospheric pressure to evaporate the water coating the produce has the desired temperature and moisture content. As an example, lettuce enters the processing area and persons would shuck off the leaves cut or damaged as a result of harvesting and transportation to the processing facility. The lettuce heads then have their cores removed, and are placed in a flume of water whose temperature is known, to be transported to chopping or shredding. The chopped lettuce is moved to perforated trays which, when full, are moved into a vacuum chamber to be both chilled and dried. This transport by water has the effect of preparing the lettuce temperature and water coating such that the quantity of lettuce, at a known temperature, with a known moisture content and coating, could be cooled and dried to a desired temperature and moisture content. Cooling and drying chopped produce by vacuum pressure with warm water increases the yield from the produce by preventing the damage that occurs during centrifuge drying process while also reducing the number of times the produce is handled before packaging by increasing the cooling/drying batch size.

While measuring the sub atmospheric pressures to control the vacuum cooling process is the most accurate and reliable method to measure heat, alternatively, and less preferably, simply tracking the temperature is feasible. The wet bulb temperatures or temperature reading probes inserted into the produce, and left there during cooling to measure produce temperature can track the temperatures. Another method for measuring the total heat to be removed from a load of produce, and thereby control the cooling process, would be to circulate a liquid in a closed loop system inside the chamber. One would measure the temperature of the liquid entering the vacuum chamber, and then measure the temperature of the liquid leaving the chamber. The difference provides a measure of the amount of heat emitted from the cooling produce, and permits adjustment accordingly.

For example, an operator of a vacuum cooling chamber cooling without water (Iceberg Lettuce, Cabbage, Bok Choi or Napa Cabbage) would start the vacuum pump and watch as the pressure fell in the chamber at a rate of 2 mm per second. As the pressure is reduced, the controller detects that when the sub atmospheric pressure within the chamber reaches 13.3 mm the rate of pressure decrease slows to a 1.0 mm decrease every thirty seconds. This change in the rate of decrease indicates that the temperature of the interstitial water evaporating from the produce is 60.0° F. After reading the change in the rate of pressure reduction in the chamber, the controller sets the holding time after reaching the 4.6 mm set point at nineteen minutes. This amount of holding time insures that all of the heat in the core of the produce is conducted out, leaving the produce cool throughout. At 60.0° F. the desired temperature reduction is 27.0° F. The process is as follows:

20 Boxes Bok Choi/pallet
75 lbs/box
1500 lbs/pallet × 12 Pallets/load
18,000 lbs/load × .01 (1% water weight evaporated/–10° FAT)
180.0 lbs. of water × 2.7 (Desired cooling moisture 27.0° F. ÷ 10°)
486.0 lbs water × 1061.0 Btu/lbs water evaporated
515,646 Btu's cooling/load An operator of a vacuum cooling chamber utilizing sprayed water (cooling Celery, Romaine, Red Leaf, Green leaf, Butter or Iceberg Lettuces) loads the produce into the chamber, closes the doors, starts the vacuum pump, sprays 40° F. water and watches as the pressure falls to 26.2 mm. At that time, there is an increase in the sub atmospheric pressure indicating that the equilibrium temperature of the water on the produce is 80° F. After reading this increase the controller recognizes that the desired temperature reduction is 47° F. and sets the time after reaching the 4.6 mm set point at 5 minutes for leaf lettuces (more for Romaine or Celery). The process to cool Red or Green Leaf lettuce is as follows:

```
Increase water temperature 5 degrees F.:

1000 Gallon reservoir × 8.345 Pounds/gallon
8345 Pounds of water × 1 Btu/pound of water temperature increase
       8345 Btu's × 5° F. Desired water temperature increase
                      41,725 Btu's per load
                  Reduce produce temperature:

49 boxes Red Leaf/Green Leaf per pallet × 26 lbs per box
              1274 lbs per pallet × 12 pallets per load
       15,288 lbs/Load × .01 (1% Water Evaporated 1°–10° FΔT)
    152.8 lbs Water × 4.7 (Desired cooling, moisture ΔT 47° ± 10°)
                         718.5 lbs Water
                  Btu's/lbs water evaporated = 1058
                Produce cooling Btu per load   760,532.3
                 Water cooling Btu per load    41,725.0
                 Total cooling Btu's per load  812,257.3
```

To cool four thousand pounds of chopped Iceberg lettuce, transport the lettuce in a flume with 45° F. water allowing sufficient time for water temperature to be conducted through the produce tissue. Deposit lettuce in a perforated tray and move the tray into the vacuum chamber. Start vacuum pump and reduce pressure inside chamber. Evaporative flash occurs at 7.63 mm, as vacuum pump reduces pressure inside the chamber to 4.7 mm pressure. The reduction to 4.7 mm of pressure insures that the desired amount of interstitial moisture remains in the lettuce tissue while the temperature reaches the optimal level.

```
To cool chopped or processed lettuce:

4000 lbs of processed lettuce × 1% of water evaporated/–10° ΔT
   40.0 lbs water × 1.2 (desired cooling ΔT 12° ± 10°)
   48 lbs water × 1071 Btu's/pound of water evaporated
                     51,408 Btu's per load
```

BRIEF DESCRIPTION OF THE DRAWINGS

The invention can better be understood by reference to the drawings in which:

Exhibit 1 is the United States Department of Agriculture Marketing Research Report, No. 469, Factors Affecting Temperature Reduction and Weight Loss in Vacuum Cooled Lettuce, by W. R. Barger.

Exhibit 2 is an article entitled Thermodynamic Properties of Steam, by Joseph H. Keenan and Frederick G. Keyes.

Figure 1:
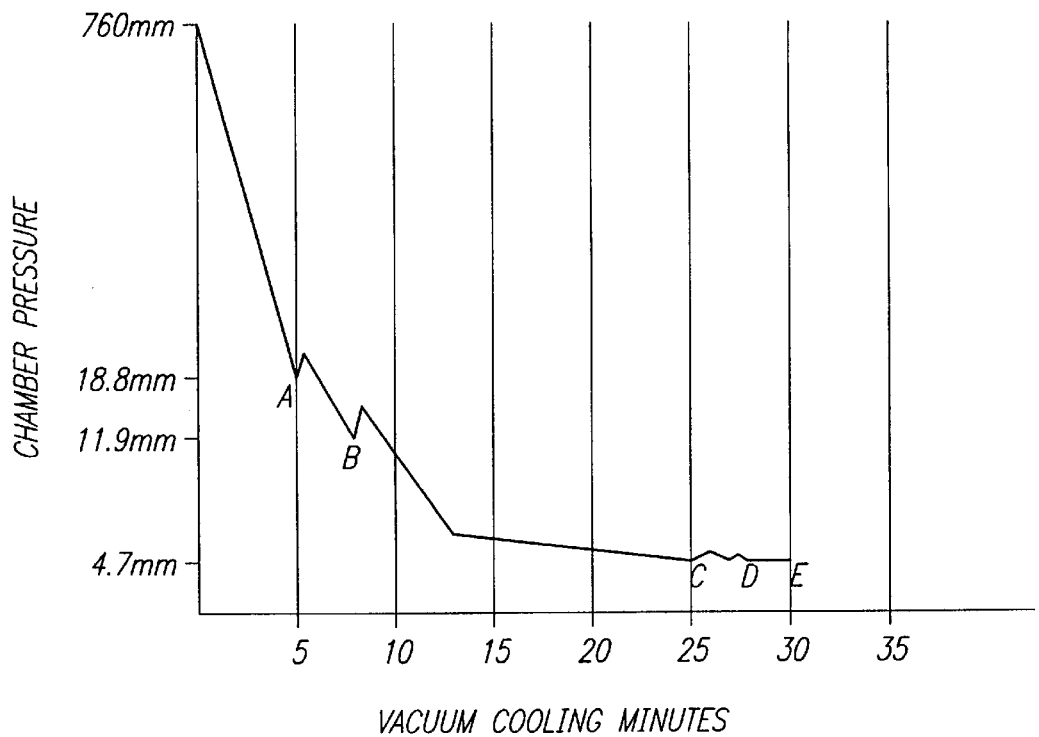
Figure 2:
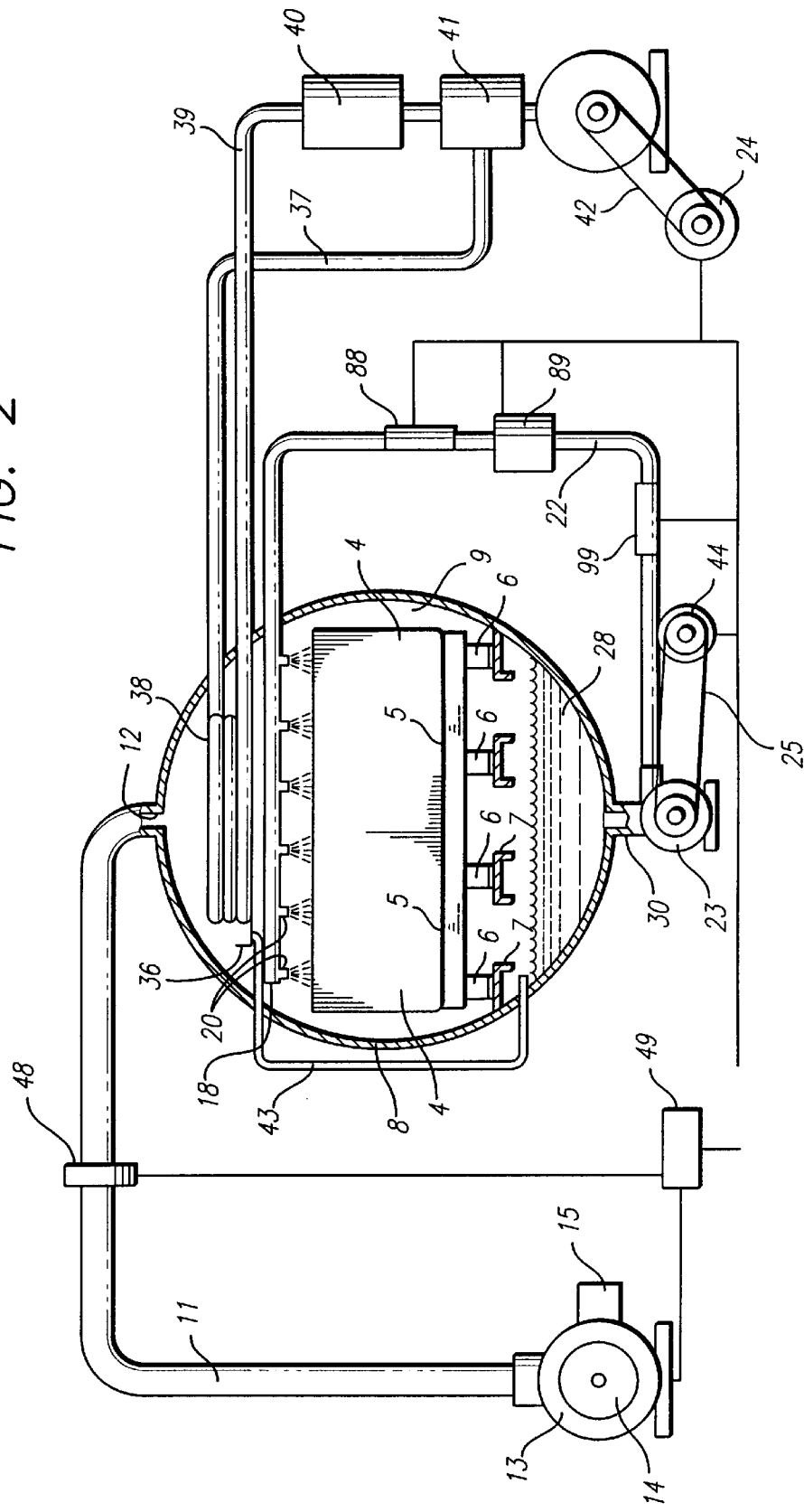

FIG. 1 is a chart showing a representative vacuum chamber sub atmospheric pressure versus process time relationship; and FIG. 2 is a schematic diagram of a preferred embodiment of the vacuum chambers of this invention.

Figure 3:
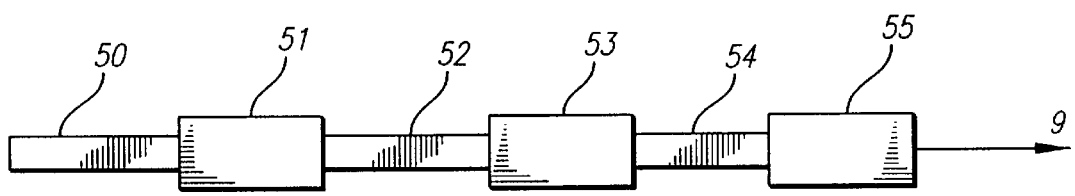

FIG. 3 is a schematic diagram of a preferred embodiment of the pre processing of produce that would be done prior to the vacuum cooling/drying process.

DETAILED DESCRIPTION OF A PREFERRED EMBODIMENT

FIG. 2 shows a schematic of a produce cooler for removing field heat and for cooling soft, porous produce such as lettuce, celery, spinach and cabbage. The produce is placed in containers or cartons 4, stacked on a cart 5, and supported on wheels 6 positioned to run on rails 7 extending from outside to the interior of vacuum tube 8. Usually the produce is packed in ventilated cartons that are stacked on carts 5 at a manageable height.

Vacuum tube 8 forms a vacuum chamber 9 which receives carts 5. Tube 8 is formed of metal of sufficient strength to permit a substantial partial vacuum to be drawn in chamber 9. Usually chamber 8 includes end doors (not shown) that allow carts 5 to be rolled in and out and are then closed for vacuum cooling.

For evacuating chamber 9, duct 11 connects with opening 12 in the upper surface of vacuum tube 8, and extends to vacuum pump 13 driven by motor 14 that includes outlets 15 for discharging evacuated air into the atmosphere. Thus, produce containers 5 can be moved into vacuum tube 8 on carts 5 and a partial vacuum can then be drawn in tube 8 to cause evaporation of moisture from the produce, thereby cooling the produce.

For a further cooling effect, a water manifold 18 is positioned over the produce. Manifold 18 includes a plurality of spray nozzles 20 for spraying water onto the produce and for returning the chamber to atmospheric pressure. A pipe 22 connects with a pump 23 driven by an electric motor 44 connected to pump 23 by belt 25. Inlet duct 30 connects with pump 23 to supply water from a sump 29 in the bottom of vacuum tube 8. Some kinds of produce are adequately cooled by imposing a partial vacuum alone, and without spraying water on the produce. For such produce, condensed water is simply removed from sump 28 and is not recycled to manifold 18.

To minimize the amount of water reaching pump 13, refrigeration coil 38 is positioned above the produce in vacuum tube 8. Coil 38 condenses water vapor from the produce, preventing water from reaching pump 13. Coil 38 also provides additional cooling for produce in tube 8. The coil is supplied with cold refrigerant through an inlet pipe 39 leading from refrigerator mechanism 40. Connected to this mechanism is refrigerator compressor 41. Motor 24 drives compressor 41 by means of drive belt 42. The refrigerant in coil 38 causes water vapor to condense, forming water droplets, which fall by gravity into collector 36. This collected water then flows through drain pipe 43 into sump 28. Collector 36 prevents the condensed water from falling onto the produce thus preventing the bruising and discoloration that would otherwise occur.

Water pump 23 pumps water through pipe 22, through the ozone, peroxide, or ultra-violet light disinfectant chamber 99, manifold 18, and spray nozzles 20, onto the produce. In chamber 99, the water is subjected to ozone, peroxide, and/or UV radiation, alone or in combination, at any intensity and for a time sufficient to destroy substantial quantities of biological contaminants in the water. Washing produce with the resulting de-contaminated water increases the marketability of such produce.

Water is cooled by contact with coil 38. This water may be sprayed onto the produce, or may be warmed by passing it through a heat exchanger 89. After warming, the water may be applied in a spray such that the water will fall evenly on the surface of the produce. The reservoir of water in sump 28 provides sufficient humidity to minimize produce dehydration. After reaching the desired sub atmospheric set point, valve 48 in duct 11 between vacuum chamber 9 and vacuum pump 13 is closed, and the pressure is detected by controller 49. If the sub atmospheric pressure rises, valve 48 is reopened to continue evaporative cooling. When valve 48 is closed, if the controller 49 detects no increase in pressure, the produce is cooled to the desired temperature.

After the produce is cooled, valve 88 is opened to allow air to flow from the outside atmosphere through sprinkler supply pipe 22 and sprinkler nozzles 20 into vacuum chamber 9. This action raises the pressure inside chamber 9 to the outside pressure allowing the chamber doors to be opened and the produce on carts 5 to be removed.

FIG. 3 shows a schematic of a possible pre vacuum cooling process which could be used to prepare produce to be cooled and dried. Produce is placed in bins or boxes in the field and brought to the processing facility. The produce in containers is emptied into or onto a conveyor or flume 50 and transported to an inspection area 51 where processors remove parts of the produce damaged by farming, harvest or shipment to the processing center. After partitioning the product the produce moves by flume or conveyor 52 to a processor 53 to be chopped, shredded or otherwise processed into a commercially desirable product. Once processed, the product travels by conveyor or flume 54 to baskets or trays 55 which then are transported to a vacuum chamber 9 at which time the vacuum cooling/drying process is the same as written above.

At time zero, a vacuum pump is started and water may be sprayed on the produce. The sub atmospheric pressure falls to the pressure corresponding to the vapor point of the water in the tissue of the produce or to the equilibrium water temperature, Point A. At this time, the pressure rises or ceases falling for a period of time. Resulting evaporation cools the produce tissue. At this time, depending on the pressure at which evaporation occurred, a controller may elect to spray a second amount of temperature controlled water. This water reaches a new, lower temperature equilibrium on the surface tissue of the produce. When the sub atmospheric pressure within the chamber reaches the new water equilibrium temperature vapor point, Point B, the water coating evaporates, further cooling the produce and causing the pressure within the chamber to cease falling or increase. Again, the process controller reads the sub atmospheric pressure value where vaporization occurred, and determines whether water should be sprayed for further cooling effect, or reads that the pressure in the chamber has fallen to set point C.

Set point C is a minimum, desired sub atmospheric pressure value. The set point pressure is maintained by allowing a small amount of air to enter the chamber through a port in the chamber, offsetting the removal of air by the vacuum pump. At this pressure, the controller, after having read and recorded the evaporation points (A, B, etc.), decides how long after reaching the set point C pressure the produce should remain in the chamber for further evaporation. This time in the chamber after reaching the set point value allows the heat to leave the core of the produce, assuring consistent temperature and quality.

After holding the produce in the chamber for the desired time, the process arrives at time point D. At point D valve 48 is closed and the controller detects the sub atmospheric pressure in the chamber. Upon reading that pressure, after valve 48 is closed, if the sub atmospheric pressure remains unchanged, the controller recognizes that the desired amount of temperature reduction has occurred, and the cooling process is finished, point E.

Where the produce is vacuum cooled without water, or is prepared for cooling by cooling and/or coating the produce with water to be evaporated, the cooling temperature versus time charts of Exhibit 1, Page 12, FIG. 5 provides representations of this type of process.

What is claimed is:

1. A produce cooler comprising a vacuum chamber, means in said chamber for supporting produce therein, means for pumping out said chamber to provide a vacuum therein, means in said chamber for applying water to said produce in said chamber from above said produce and from which said condensed water vapor is free to run by gravity over said produce; means for controlling the pressure within said vacuum chamber, and means for selecting and controlling the temperature of said water for application to said produce to allow applied water to evaporate, cooling said produce, while limiting evaporation of interstitial water to minimize damage to said produce from interstitial water loss during said cooling process.

2. The produce cooler of claim 1 including a sump in said chamber for catching water draining from said produce, and means for circulating water from said sump to said applying means.

3. The produce cooler of claim 1 in which said pumping out means includes a connection to said chamber at the top thereof.

4. A produce cooler comprising:
   a vacuum chamber including a support for produce in said chamber; means for
   forming a partial vacuum in said chamber;
   means for delivering produce having water thereon to said chamber; means for
   cooling and condensing water vapor from said chamber;
   means for releasing said partial vacuum within said chamber;
   means for adjusting the temperature, pressure or both of vacuum cooling within said chamber, and means for selecting and controlling the temperature of said water on said produce to allow applied water to evaporate, cooling said produce, while limiting evaporation of interstitial water to minimize damage from interstitial water loss to said produce from said cooling process.

5. The produce cooler of claim 4 further comprising means for controlling the temperature of water to be applied to said produce.

6. The produce cooler of claim 4 or claim 5 further comprising means for applying water to said produce outside of said chamber.

7. A produce cooler comprising: a vacuum chamber, means in said chamber for supporting produce therein, means for pumping out said chamber to provide at least a partial vacuum therein, means in said chamber for applying water to said produce and to allow said water to flow downward over said produce, means for cooling and condensing water vapor in said chamber at a location above said produce to cause cool condensed water to flow downward over said produce, a sump in the bottom of said chamber for collecting and holding water, a pipe extending into said vacuum chamber to vent outside air into said chamber to relieve the vacuum therein so the chamber can be opened and the cooled produce removed, said pipe including means to regulate the flow of air into said vacuum chamber to slow the rate of increase of air pressure in said vacuum chamber, means for controlling the pressure and time duration of vacuum cooling within said chamber, and means for selecting and controlling the temperature of said water for application to said produce to allow applied water to evaporate, cooling said produce, while limiting evaporation of interstitial water to minimize damage to said produce from interstitial water loss during said cooling process.

8. The produce cooler of claim 7 wherein said means to regulate the flow of air into said vacuum includes an outlet connecting with said pipe inner end to deliver incoming air into said vacuum chamber.

9. The produce cooler of claim 8 wherein said outlet is located beneath the water in said sump to cause said incoming air to pass through said water as it enters said vacuum chamber.

10. The produce cooler of claim 7 wherein said pipe inner end is located beneath the water in said sump to cause incoming air to pass through said water as it enters said vacuum changer.

11. A produce cooler comprising: a vacuum chamber, means in said chamber for supporting produce therein, means for pumping out said chamber to provide at least a partial vacuum therein to cool said produce by evaporation, means in said chamber for applying water to said produce in said chamber and to allow said water to flow downward over said produce, a sump in the bottom of said chamber for collecting and holding water, a pipe emending into said vacuum chamber to deliver outside air into said chamber to relieve the vacuum therein so the chamber can be opened and the cooled produce removed, said pipe including means to regulate the flow of incoming air into said vacuum chamber to slow the rate of increase of air pressure in said vacuum chamber; and means for selecting and controlling the temperature of said water for application to said produce to allow applied water to evaporate, cooling said produce, while lining evaporation of interstitial water to minimize damage to said produce from interstitial water loss during said cooling.

12. A produce cooler comprising:

a vacuum chamber including a support for produce in said chamber; means for forming a partial vacuum in said chamber;

means in said chamber for applying water to said produce;

means for cooling and condensing water vapor in said chamber;

means for collecting condensed water vapor and for minimizing condensed water vapor flow onto said produce;

means for releasing said partial vacuum within said chamber; and means for selecting and controlling the temperature of said water for application to said produce to allow applied water to evaporate, cooling said produce, while limiting evaporation of interstitial water to minimize damage to said produce from interstitial water loss in said cooling process.

13. The produce cooler of claim 12 further comprising a sump in said chamber for receiving condensed water vapor from said produce.

14. The produce cooler of claim 13 further comprising means connected to said sump for circulating condensed water vapor from said sump to said water discharging means in said chamber.

15. The produce cooler of claim 12 wherein said means for cooling and condensing water vapor in said chamber comprises refrigeration means positioned in said chamber above said support.

16. The produce cooler of claim 12 wherein said means for forming a partial vacuum in said chamber includes a vacuum-forming pump connected to said vacuum chamber by a duct connected to an opening in said vacuum chamber.

17. The produce cooler of claim 12 wherein said means for cooling and condensing water vapor in said chamber is positioned above said support, and above a collector positioned below said condenser for receiving condensed water vapor, said collector being connected to a sump at the bottom of said chamber to receive condensed water vapor from said collector.

18. A method for removing heat from field-harvested produce comprising placing said produce in a vacuum chamber on a support for said produce; forming a partial vacuum in the chamber; discharging water onto said produce; releasing said partial vacuum within said chamber; cooling and condensing water vapor formed in said chamber; detecting and adjusting the temperature, pressure or both within said chamber dynamically during said cooling step, and selecting and controlling the temperature of said water for application to said produce to allow allied water to evaporate, cooling said produce, while limiting evaporation of interstitial water to minimize removal of interstitial water from said produce.

19. The method of claim 18 further comprising collecting said condensed water vapor in said chamber, and reusing said condensed water vapor in said spraying.

20. The produce cooler of claim 12 wherein said means for releasing said partial vacuum within said chamber is in said water discharging means.

21. A produce cooler comprising:

a vacuum chamber including a support for produce in said chamber;

means for forming a partial vacuum in said chamber;

means in said chamber for applying water to said produce;

means for cooling and condensing water vapor in said chamber;

means for releasing said partial vacuum within said chamber through said water discharging means;

means for detecting temperature, pressure, or both and changes in temperature and pressure within said vacuum chamber, means for adjusting the temperature, pressure or both of vacuum cooling within said chamber, and means for selecting and controlling the temperature of said water for application to said produce to allow applied water to evaporate, cooling said produce, before interstitial evaporates to minimize damage from interstitial water loss to said produce from said cooling process.

22. The produce cooler of claim 21 further comprises means for collecting condensed water vapor and for preventing said condensed water vapor from falling directly onto said produce.

23. The produce cooler of claim 21 further comprising a sump in said chamber for receiving condensed water vapor from said produce.

24. The produce cooler of claim 23 further comprising means connected to said sump for circulating condensed water vapor from said sump to said water discharging means in said chamber.

25. The produce cooler of claim 21 wherein said means for cooling and condensing water vapor in said chamber comprises refrigeration means positioned in said chamber above said support.

26. The produce cooler of claim 21 wherein said means for forming a partial vacuum in said chamber includes a vacuum-forming pump connected to said vacuum chamber by a duct connected to an opening in said vacuum chamber.

27. The produce cooler of claim 21 wherein said means for cooling and condensing water vapor in said chamber is positioned above said support, and above a collector positioned below said condenser for receiving condensed water vapor, said collector being connected to a sump at the bottom of said chamber to receive condensed water vapor from said collector.

28. A produce cooler comprising:

a vacuum chamber including a support for produce in said chamber; means for forming a partial vacuum in said chamber;

means in said chamber for applying water to said produce;

means for cooling and condensing water vapor in said chamber;

means for collecting condensed water vapor and for minimizing condensed water vapor flow onto said produce;

means for subjecting said condensed water vapor to at least one member from the group consisting of ozone, peroxide and UV radiation to remove a majority of biological contaminants from said condensed water vapor;

means for releasing said partial vacuum within said chamber;

means for detecting temperature, pressure, or both and changes in temperature, pressure or both, within said vacuum chamber;

means for adjusting the pressure and time duration of vacuum cooling within said chamber, and means for selecting and controlling the temperature of said water for application to said produce to allow applied water to evaporate, cooling said produce, while limiting evaporation of interstitial water to minimize damage to said produce from interstitial water loss during said cooling process.

29. The produce cooler of claim 28 further comprising a sump in said chamber for receiving condensed water vapor from said produce.

30. The produce cooler of claim 29 further comprising means connected to said sump for circulating condensed water vapor from said sump to said water discharging means in said chamber.

31. The produce cooler of claim 28 wherein said means for cooling and condensing water vapor in said chamber comprises refrigeration means positioned in said chamber above said support.

32. The produce cooler of claim 28 wherein said means for forming a partial vacuum in said chamber includes a vacuum-forming pump connected to said vacuum chamber by a duct connected to an opening in said vacuum chamber.

33. The produce cooler of claim 28 wherein said means for cooling and condensing water vapor in said chamber is positioned above said support, and above a collector positioned below said condenser for receiving condensed water vapor, said collector being connected to a sump at the bottom of said chamber to receive condensed water vapor from said collector.

34. A method for removing heat from field-harvested produce comprising placing said produce in a vacuum chamber on a support for said produce; forming a partial vacuum in the chamber; applying water to said produce; releasing said partial vacuum within said chamber; cooling and condensing water vapor formed in said chamber; subjecting the condensed water vapor to at least one member from the group consisting of ozone, peroxide and UV radiation to remove a majority of biological contaminants from the condensed water vapor; and selecting and controlling the temperature of the water for application to said produce to allow applied water to evaporate, cooling said produce, while limiting evaporation of interstitial water to minimize damage to said produce from interstitial water loss from said cooling process.

35. The method of claim 34 further comprising collecting said condensed water vapor in said chamber, and reusing said condensed water vapor in said spraying.

36. The produce cooler of claim 28 wherein said means for releasing said partial vacuum within said chamber is in said water discharging means.

37. A produce cooler comprising:

vacuum chamber including a support for produce in said chamber; means for forming a partial vacuum in said chamber;

means in said chamber for applying water to said produce;

means for cooling and condensing water vapor in said chamber;

means for subjecting said condensed water vapor to at least one member selected from the group consisting of ozone, peroxide and UV radiation to remove a majority of biological contaminants from said condensed water vapor;

means for releasing said partial vacuum within said chamber through said water discharging means, and means for selecting and controlling the temperature of said water for application to said produce to allow applied water to evaporate, cooling said produce, while limiting evaporation of interstitial water to minimize damage to said produce from interstitial water loss in said cooling process.

38. The produce cooler of claim 37 further comprising means for collecting condensed water vapor and for preventing said condensed water vapor from falling directly onto said produce.

39. The produce cooler of claim 37 further comprising a sump in said chamber for receiving condensed water vapor from said produce.

40. The produce cooler of claim 37 further comprising means connected to said sump for circulating condensed water vapor from said sump to said water discharging means in said chamber.

41. The produce cooler of claim 37 wherein said means for cooling and condensing water vapor in said chamber comprises refrigeration means positioned in said chamber above said support.

42. The produce cooler of claim 37 wherein said means for forming a partial vacuum in said chamber includes a vacuum-forming pump connected to said vacuum chamber by a duct connected to an opening in said vacuum chamber.

43. The produce cooler of claim 37 wherein said means for cooling and condensing water vapor in said chamber is positioned above said support, and above a collector positioned below said condenser for receiving condensed water vapor, said collector being connected to a sump at the bottom of said chamber to receive condensed water vapor from said collector.

44. The method of claim 18 or claim 19 or claim 20 further comprising selecting a subatmospheric pressure set point corresponding to the desired temperature of the produce after cooling; selecting a desired water temperature for water to be applied to said produce; applying water at said desired temperature to said produce; reducing the pressure inside said chamber to the pressure that corresponds to the vapor pressure of the water on said produce; evaporating said water coating from said produce, thereby cooling said produce; determining the quantity of heat to be removed from said produce to reduce the temperature of said produce to the desired temperature; and repeating the spraying of said produce with water and reducing the pressure in said chamber as many times as needed to reduce the temperature of the produce to the desired temperature.

45. The method of claim 18, 19 or 20 further comprising placing subdivided produce into said vacuum chamber; selecting a sub-atmospheric pressure setpoint corresponding to the desired temperature of the produce after cooling; reducing the pressure inside said chamber to a pressure that corresponds to the vapor pressure of water, if any, on said produce; evaporating said water from said produce, thereby cooling said produce; determining the quantity of heat to be removed from said produce to reduce the temperature of said produce to the desired temperature minimal loss of interstitial moisture from said produce; and removing said quantity of heat to reach said desired temperature.

46. The method of claim 18, 19 or 20 further comprising selecting a desired temperature of the produce after cooling; selecting a desired water temperature for water to be applied to said produce; applying water at said desired temperature to said produce; evaporating said water from said produce, thereby cooling said produce; and repeating the spraying of said produce of water and reducing of the pressure in said chamber as many times as needed to reduce the temperature of the produce to the desired temperature.

\* \* \* \* \*